United States Patent
Soga et al.

(10) Patent No.: US 8,239,652 B2
(45) Date of Patent: Aug. 7, 2012

(54) DATA PROCESSING SYSTEM

(75) Inventors: Yuki Soga, Kyoto (JP); Isao Kawamoto, Hyogo (JP); Daisuke Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 808 days.

(21) Appl. No.: 12/109,894

(22) Filed: Apr. 25, 2008

(65) Prior Publication Data
US 2009/0031101 A1 Jan. 29, 2009

(30) Foreign Application Priority Data

Jul. 27, 2007 (JP) ................. 2007-196211

(51) Int. Cl.
- G06F 13/00 (2006.01)
- G06F 12/00 (2006.01)
- G06F 9/26 (2006.01)
- G06F 9/34 (2006.01)

(52) U.S. Cl. ........ 711/200; 711/202; 711/203; 711/205; 711/206; 711/207; 711/147; 711/150; 711/154

(58) Field of Classification Search .................. 711/147, 711/150, 154, 200, 202, 203, 205, 206, 207
See application file for complete search history.

(56) References Cited

U.S. PATENT DOCUMENTS
2002/0152360 A1 * 10/2002 Didier et al. ................... 711/150
2002/0161983 A1 * 10/2002 Milos et al. ................... 711/202

FOREIGN PATENT DOCUMENTS
| EP | 1 067 461 A1 | 1/2001 |
| JP | 61-026167 A | 2/1986 |
| JP | 02-101552 | 4/1990 |
| JP | 05-173930 | 7/1993 |
| JP | 10-275129 | 10/1998 |
| JP | 11-184798 | 7/1999 |

* cited by examiner

*Primary Examiner* — Midys Rojas
(74) *Attorney, Agent, or Firm* — McDermott Will & Emery LLP

(57) ABSTRACT

Before arbitration is performed in an arbitration section, an access from a master is kept in a waiting state until update of a conversion table buffer is performed, and an address conversion section is provided in a subsequent stage of the arbitration section. Without waiting for the completion of buffer update, an access is issued in advance at a time when it is assured that update is completed at the completion of address conversion. Thus, influences of waiting buffer update on another master can be eliminated and access latency can be reduced.

21 Claims, 8 Drawing Sheets

DATA PROCESSING SYSTEM

BACKGROUND OF THE INVENTION

1. Field of the Invention

The present invention relates to a data processing system in which a plurality of masters share one or more slaves.

2. Description of the Prior Art

When a plurality of masters share one or more slaves via busses, an address conversion mechanism for address conversion from an address space managed by each master into a corresponding address space managed by the shared slave(s) is generally provided to efficiently use the shared slave(s). Herein, a master is a microprocessor, DSP (Digital Signal Processor), DMA (Direct Memory Access) controller, or the like and a slave is a memory, peripheral I/O (input/output) controller, or the like. For example, when a shared slave is a memory, masters are made to use empty regions dispersed on the memory as a continuous region by means of address conversion, so that there is no need to ensure an extra static continuous region. This results in reduction in memory usage.

There are various embodiments of an address conversion mechanism. Of those embodiments, as shown in FIG. 7, a method in which an address conversion table that is an address correspondence table used for address conversion is stored in a shared slave memory and part of information of the address conversion table is fetched to a buffer (conversion table buffer) and used for an address conversion is generally adopted. If there is not necessary information for address conversion of an access on the conversion table buffer, the access is temporarily held in a waiting state in a command input control section, the conversion table buffer is updated by accessing the address conversion table by means of a buffer update control section, and address conversion is performed according to the updated information. If there is information on the buffer, a time for referring to the address conversion table on the memory can be saved and address conversion can be performed.

When a plurality of masters access a shared slave, it is necessary that respective bus accesses from the masters are arbitrated and ordered on one bus and then the bus is connected to the shared slave. As shown in FIG. 8A, a plurality of accesses are arbitrated and then the address conversion mechanism is mounted (see JP61026167A). In FIG. 8B, the address conversion mechanism is mounted on each of the masters and, after address conversion is performed, accesses are arbitrated (see EP1067461A1).

When the address conversion mechanism is mounted in a subsequent stage of arbitration of bus accesses, as shown in FIG. 8A, address conversion for all master accesses can be performed by a single address conversion mechanism. Also, since the address conversion mechanism is mounted at a point close to the shared slave, only a short time for reading table information to the buffer is needed when the address conversion table is stored in the shared slave. On the other hand, if in performing address conversion for an access from one master, there is not necessary information in a buffer and the buffer has to be updated, all subsequent accesses from another master are kept waiting during a latency time for update and, thus a problem arises in that the performance of a master, specifically, a processor or the like, requiring low latency access is largely influenced.

When address conversion is performed in a previous stage of arbitration of bus accesses, as shown in FIG. 8B, the problem in which a buffer update latency time of one master affects accesses of other masters does not arise. However, a time for arbitrating accesses of another master is added to a time for accessing the address conversion table on the shared slave, so a time for updating a buffer becomes very long. Furthermore, many address conversion mechanisms have to be mounted.

As described above, when any one of the known methods for mounting an address conversion mechanism is used, some unacceptable problem arises for each method.

SUMMARY OF THE INVENTION

To solve the above-described problems, according to the present invention, an address comparison section for judging whether or not there is necessary information in a buffer in an address conversion mechanism, a buffer update control section for controlling update of the buffer and an access issuance control section for temporarily holding an access during update of the buffer are mounted in previous stages of an arbitration section. An address conversion section for referring to the buffer and performing address conversion is mounted in a subsequent stage of the address conversion section. The access issuance control section issues an access, even though the update of the buffer is not totally completed, at a time when it is assured that necessary information for address conversion in the address conversion section is stored in the buffer.

According to the present invention, the access issuance control section exists in a previous stage of the access arbitration section. Thus, influences of waiting for buffer update for an access from one master on another master can be prevented. Moreover, the address conversion section is provided in a subsequent stage of the address conversion section and the access issuance control section issues an access without waiting for the completion of buffer update, thus resulting in reduction in access latency. Also, the address conversion section is shared by a plurality of masters, so that a mount area can be reduced.

DESCRIPTION OF THE PREFERRED EMBODIMENTS

Hereafter, embodiments of the present invention will be described with reference to the accompanying drawings.

<<First Embodiment>>

Figure 1:
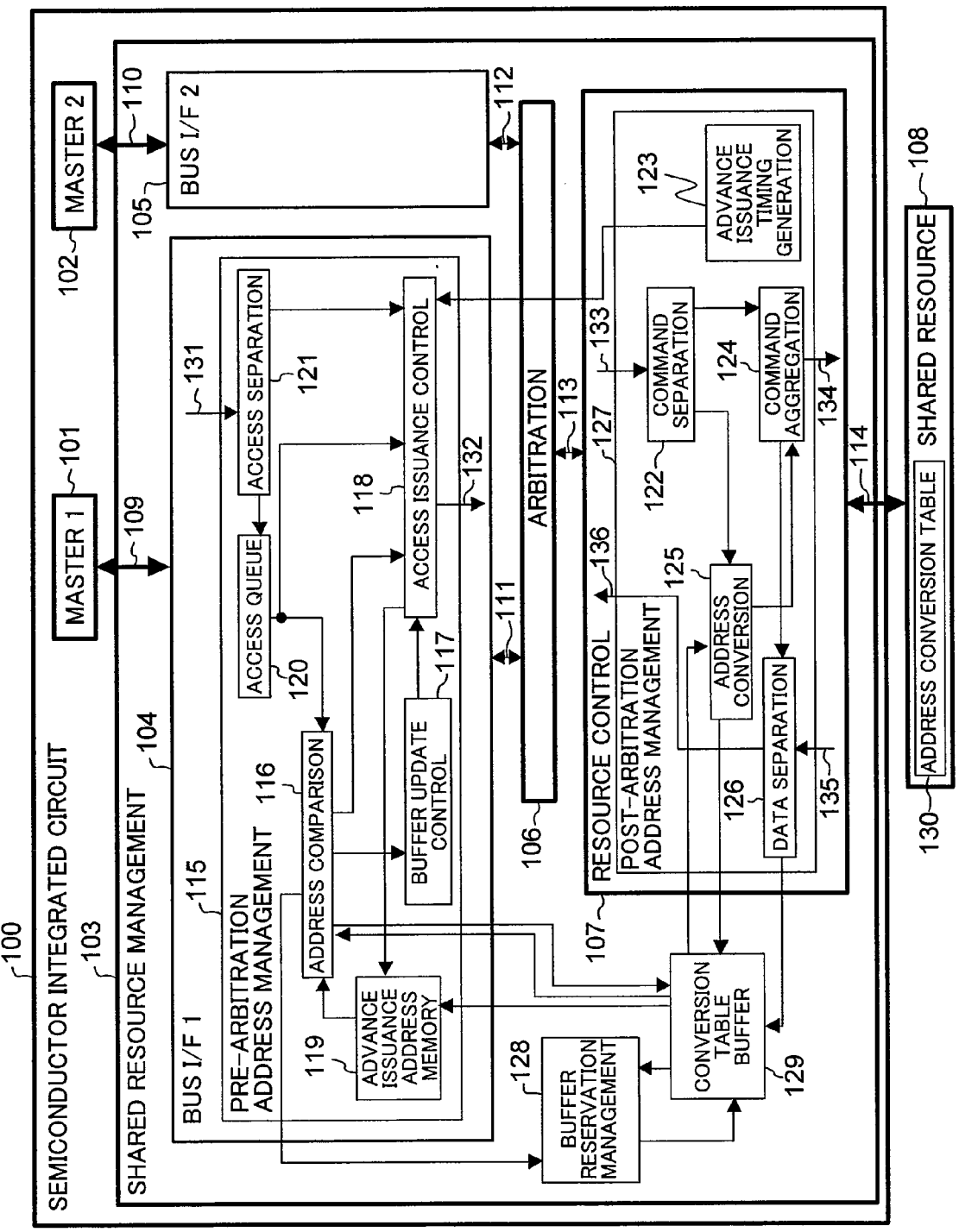
FIG. 1 is a block diagram illustrating a configuration of an electronic apparatus including a semiconductor integrated circuit which has a data processing system according to a first embodiment of the present invention.

FIG. 1 is a block diagram illustrating an electronic apparatus including a semiconductor integrated circuit which has a data processing system according to a first embodiment of the present invention. The electronic apparatus of FIG. 1 includes a semiconductor integrated circuit 100 and a shared resource 108 connected to each other via a bus 114. The "electronic apparatus" herein is arbitrary equipment, such as a cellular phone, a DVD recorder, network equipment or the like. The shared resource 108 is, for example, a semiconductor memory device such as a SDRAM, a data storage on a network, or like arbitrary equipment.

Next, an internal configuration of the semiconductor integrated circuit 100 will be described in detail. The semiconductor integrated circuit 100 includes a plurality of masters 101 and 102 and a shared resource management section 103. The masters 101 and 102 share the shared resource 108 via the shared resource management section 103. That is, the shared resource 108 is a shared slave of the masters 101 and 102. The masters 101 and 102 are connected to the resource management section 103 via buses 109 and 110, respectively, to transmit/receive an access request and data. Each of the masters 101 and 102 is, for example, a microprocessor, a DSP (Digital Signal Processor), a DMA (Direct Memory Access) controller, or the like.

The shared resource management section 103 includes bus I/F (interface) sections 104 and 105, an arbitration section 106 and a resource control section 107. Signal lines 111 and 112 are provided between the bus I/F section 104 and the arbitration section 106 and between the bus I/F section 105 and the arbitration section 106, respectively. Another signal line 113 is provided between the arbitration section 106 and the resource control section 107. The bus I/F sections 104 and 105 receive accesses from the masters 101 and 102 via the buses 109 and 110, respectively, to perform control over output of the access to the arbitration section 106 and also perform control over exchange of data with the masters 101 and 102 via the buses 109 and 110, respectively. The arbitration section 106 arbitrates accesses sent from the masters 101 and 102 via the bus I/F sections 104 and 105 to select and output an access to the resource control section 107. The resource control section 107 performs control of the shared resource 108 according to the received access.

The shared resource management section 103 has, as address conversion mechanisms, a pre-arbitration address management section 115 and a post-arbitration address management section 127 in the bus I/F section 104 and the resource control section 107, respectively. In addition, a conversion table buffer 129 and a buffer reservation management section 128 are mounted in the shared resource management section 103. Also, an address conversion table 130 that is necessary information for address conversion is stored in the shared resource 108. The pre-arbitration address management section 115 includes an access separation section 121, an access queue 120, an address comparison section 116, a buffer update control section 117, an access issuance control section 118 and an advance issuance address memory section 119. The post-arbitration address management section 127 includes a command separation section 122, an advance issuance timing generation section 123, a command aggregation section 124, an address conversion section 125 and a data separation section 126.

Figure 2:
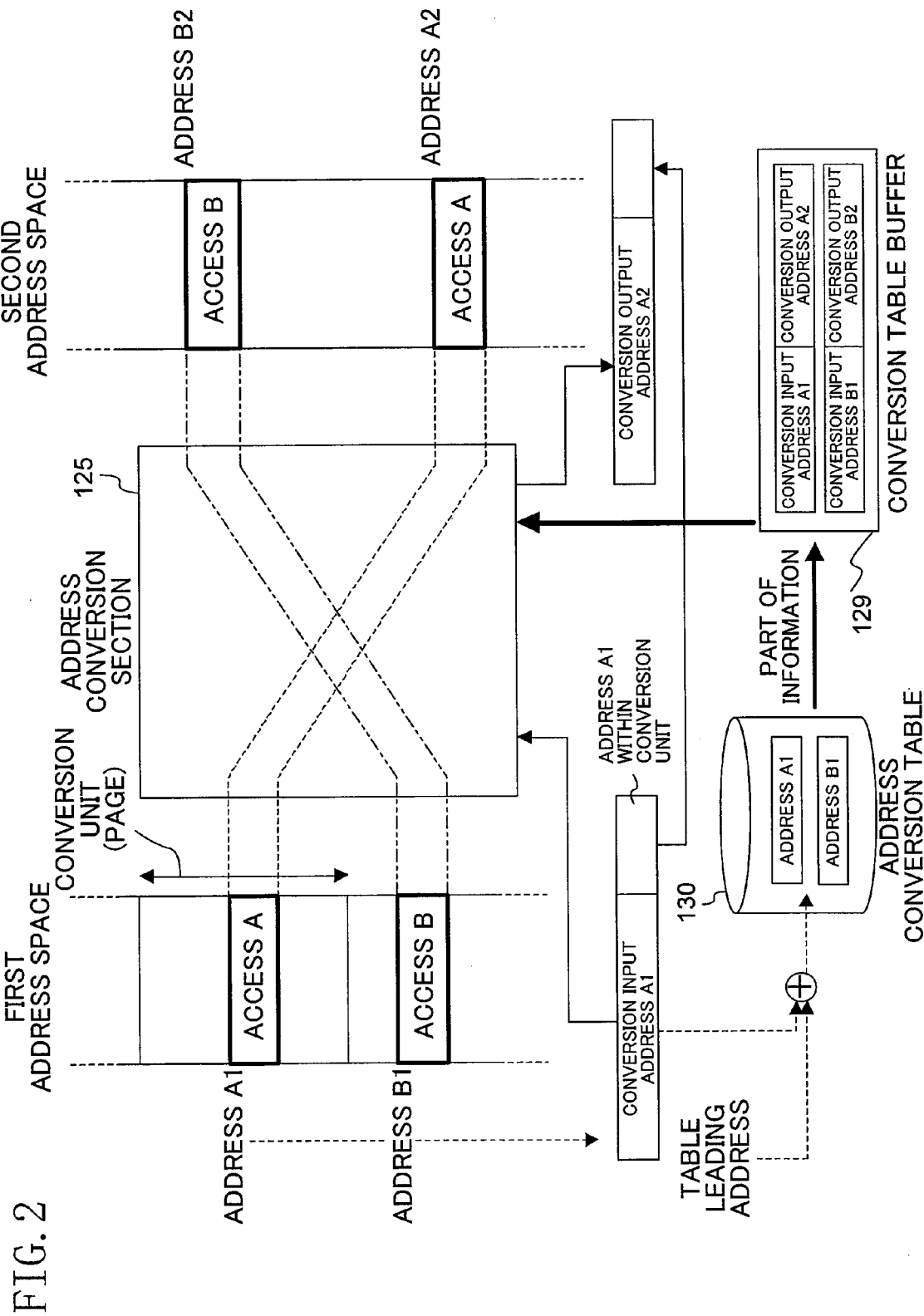
FIG. 2 is a conceptual illustration of address conversion in the configuration of FIG. 1.

FIG. 2 is a diagram illustrating an image of an address conversion method using the address conversion table 130 and the conversion table buffer 129. A first address space is an address space managed by the master 101 and a second address space is an address space for accessing the shared resource 108. In the example of FIG. 2, address conversion is performed for each conversion unit of a predetermined size. Address conversion of an address in a conversion unit is performed in such a manner that lower bits of an address in the first address space are used, as they are, as lower bits of an address in the second address space.

In the address conversion table 130, in a region of the address conversion table 130 determined by each address in the first address space, a corresponding address in the second address space is stored. In the example of FIG. 2, in an address location obtained by adding a start location of the address conversion table 130 in the shared resource 108 to upper bits of an address in the first address space, upper bits of a corresponding address in the second address space are stored.

In the conversion table buffer 129, part of an address in the first address space and a corresponding address in the second address space, which has been read from the address conversion table 130, are held as a pair of a conversion input address and a conversion output address. For example, according to information of the conversion table buffer 129, the address conversion section 125 converts an address A1 in the first address space into a corresponding address A2 in the second address space.

Next, the pre-arbitration address management section 115 provided in the bus I/F section 104 will be described in detail.

The access separation section 121 separates, of access requests received from an access input path 131, address conversion target accesses from non-address conversion target accesses so that address conversion is not performed to addresses of non-address conversion target accesses. An access obtained by performing various processing to an access request command transmitted from the master 101 via the bus 109 in the bus I/F section 104 is transmitted to the access input path 131. As a separation method performed in the access separation section 121, a method in which accesses are separated according to an input address range, a method in which accesses are sorted according to ID numbers given to the accesses as information, or like method can be used.

The access queue 120 stores address conversion target accesses separated by the access separation section 121 and sequentially outputs an access each time a subsequent stage receives an access.

The address comparison section 116 outputs as a search key part of an address to the conversion table buffer 129 and notifies the access issuance control section 118 of a search result obtained from the conversion table buffer 129 to check whether or not necessary information for address conversion of a target access is stored in the conversion table buffer 129. At the same time, information for the advance issuance address memory section 119 (which will be described later) is checked and, if there is not necessary information either in the advance issuance address memory section 119 or in the conversion table buffer 129, necessary information for update is transmitted to the buffer update control section 117. A reservation of necessary information for conversion is made to the buffer reservation management section 128 (which will be described later).

According to information from the address comparison section 116, the buffer update control section 117 reads necessary data from the address conversion table 130 and generates a buffer update access which is to be stored in the conversion table buffer 129.

According to information from the access separation section 121 and the address comparison section 116, the access issuance control section 118 selects, if the access is not an address conversion target, an access separated by the access separation section 121 and selects, if the access needs address conversion and there is information which is necessary for address conversion in the conversion table buffer 129, an access output from the access queue 120. If there is not necessary information in the conversion table buffer 129, the access issuance control section 118 temporarily makes an access output from the access queue 120 wait, selects the buffer update access from the buffer update control section 117. The access selected by the access issuance control section 118 is outputted to an access output line 132. The output access is subjected to various processing in the bus I/F section 104 and is output onto the signal line 111 connected to the arbitration section 106. When a timing signal is generated from the advance issuance timing generation section 123, the access from the access queue 120 which is kept waiting is issued on the signal line 111 connected to the arbitration section 106 even before the completion of update of the conversion table buffer 129.

The advance issuance address memory section 119 stores an address indicated by the access issued before the completion of update of the conversion table buffer 129 in the access issuance control section 118. The information that the address is stored by the advance issuance address memory section 119 is added to the buffer update access and, when update of the conversion table buffer 129 is completed, the advance issuance address memory section 119 is notified of the completion of update. On receiving this notification, the stored address is deleted.

Next, the post-arbitration address management section 127 provided in the resource control section 107 will be described in detail.

The command separation section 122 separates accesses transferred via a command input line 133 so that address conversion is not performed to non-address conversion targets separated by the access separation section 121 and the buffer update access. Accesses which have been transferred from the arbitration section 106 via the signal line 113 and to which various processing have been performed in the resource control section 107 are transferred to the command input line 133. Moreover, a flag is added to each non-address conversion target access, a flag indicating as a buffer update access by the buffer update control section 117 is added to each access and those flags are judged by the command separation section 122, thereby realizing command separation by the command separation section 122.

The address conversion section 125 outputs, in response to an address conversion target access separated by the command separation section 122, an address to the conversion table buffer 129, refers to information which is searched using the output address as a key in the conversion table buffer 129 and then performs address conversion. A result of the address conversion is output to the command aggregation section 124.

The command aggregation section 124 aggregates an access separated by the command separation section 122 and an access address-converted by the address conversion section 125 and outputs the aggregated access via a command output line 134 to various processing of the resource control section 107 in subsequent stages. Such accesses are eventually sent to the shared resource 108 via the bus 114.

The advance issuance timing generation section 123 generates a timing signal for issuing an access waiting for update of the conversion table buffer 129 in the access issuance control section 118. The timing signal is output at an arbitrary timing assuring that update of the conversion table buffer 129 is completed and necessary information is held when the access reaches the address conversion section 125. It is the most reliable to output the timing signal at a time when update of the conversion table buffer 129 is completed. In an actual situation, however, the timing signal can be output at an earlier timing by a shortest latency from a time of issuance of an access from the access issuance control section 118 to a time of reach of the access to the address conversion section 125. As long as the above-described conditions are satisfied, various different methods may be used, such as a method in which a timing signal is generated when an update access for the conversion table buffer 129 is observed at a location in the resource control section 107, a method in which a timing signal is generated after a lapse of a certain time after the issuance of a buffer update access from the access issuance control section 118, a method in which a signal is generated at a time when a certain number of commands from another master are arbitrated by the arbitration section 106 after the issuance of a buffer update access, and the like.

The data separation section 126 fetches, from a data input line 135, data which has been read from the shared resource 108 via the bus 114 and to which various processing has been added in the resource control section 107 and separates data which is to be used for update of the conversion table buffer 129 from the fetched data. To perform this data separation, the command aggregation section 124 notifies the data separation section 126 which data corresponds to an access to the address conversion table 130. Other data is output to a data output line 136, is sent, after various processing in the resource control section 107 is performed thereto, to the bus I/F sections 104 and 105, and then is eventually transferred to the masters 101 and 102.

Next, the buffer reservation management section 128 and the conversion table buffer 129 are described in detail.

According to information from the address comparison section 116, when there is necessary information for an access in the conversion table buffer 129, the buffer reservation management section 128 reserves use of the information and keeps a buffer containing the information from being updated with another information in the address conversion table 130 until the completion of address conversion in the address conversion section 125 is notified. When there is not necessary information in the conversion table buffer 129, the buffer reservation management section 128 makes a reservation about which information in the conversion table buffer 129 is updated to new information and keeps the buffer from being updated with other information until the update is completed and is actually used in the address conversion section 125. A plurality of methods for reservation management can be used. For example, each buffer in the conversion table buffer 129 may include a flag to indicate as being reserved. A counter may be used, instead of a flag, in case a plurality of reservations concentrate to a single buffer. Also, a method in which a reservation is held as a command in a queue can be used.

The conversion table buffer 129 is a buffer for holding part of information in the address conversion table 130 as described above. In the conversion table buffer 129, information indicated by the buffer reservation management section 128 is overwritten with update data from the data separation section 126. Moreover, information in the conversion table buffer 129 is searched according to address information from the address conversion section 125 and corresponding information is output to the address conversion section 125.

Figure 3:
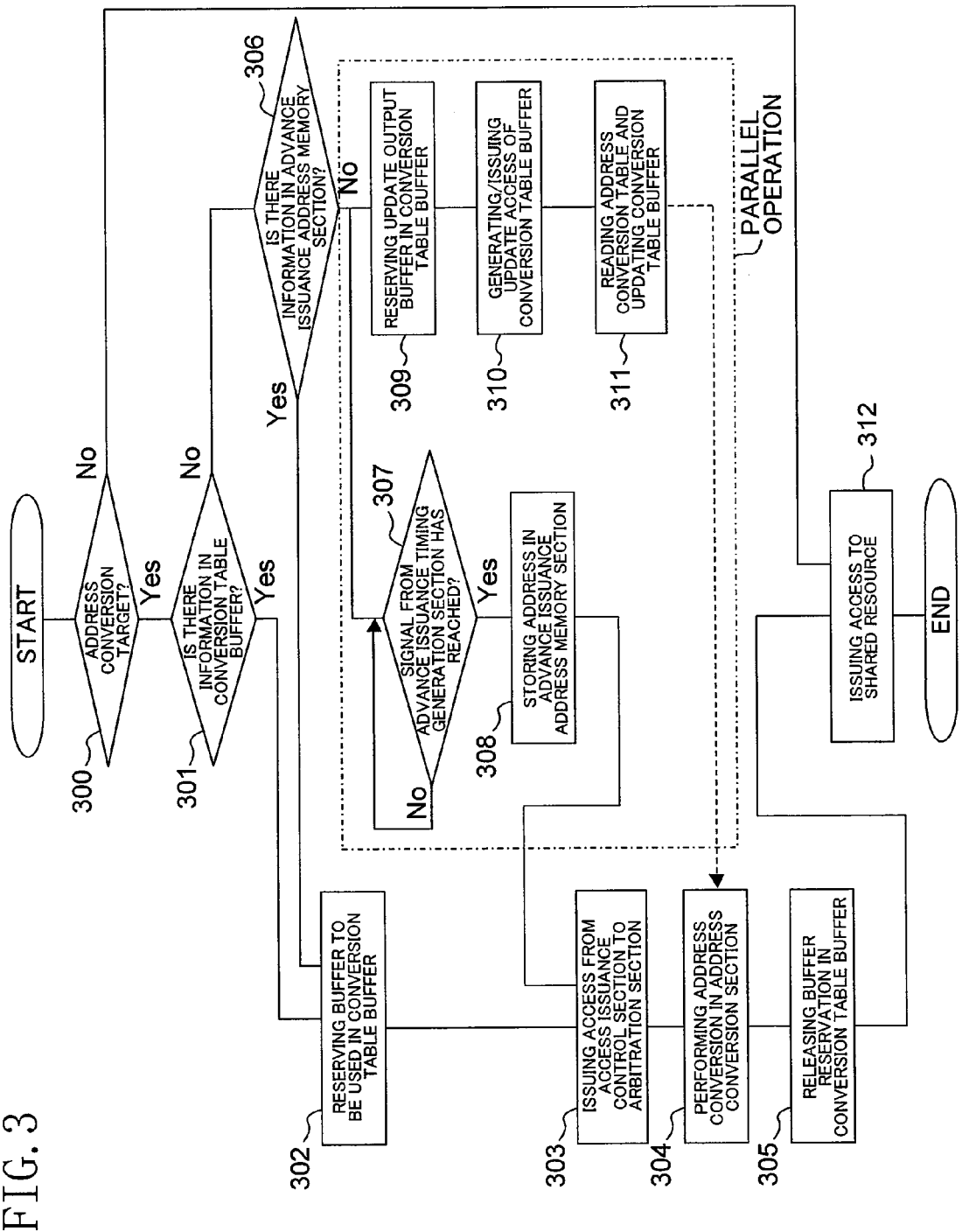
FIG. 3 is a flow chart illustrating the operation of a shared resource management section of FIG. 1.

FIG. 3 is a flow chart showing how address conversion is performed by each of the above-described blocks. When an access is issued from the master 101, first in Step 300, whether or not the access is an address conversion target access is judged by the access separation section 121. If the access is an address conversion target access, the process proceeds to Step 301 and, if not, the process proceeds to Step 312. In Step 301, whether or not there is necessary information for address conversion in the conversion table buffer 129 is judged by the address comparison section 116. If there is necessary information therein, the process proceeds to Step 302 and, if not, the process proceeds to Step 306. In Step 302, the buffer reservation management section 128 reserves a buffer to be used in address conversion in the conversion table buffer 129 and the process proceeds to Step 303. In Step 303, an access is issued from the access issuance control section 118 to the arbitration section 106 and the process proceeds to Step 304. In Step 304, the address conversion section 125 performs address conversion according to information of the conversion table buffer 129 and the process proceeding to Step 305. In Step 305, the reservation of the buffer in the conversion table buffer 129 which has been used in address conversion is released in the buffer reservation management section 128 and the process proceeds to Step 312.

In Step 306, whether a corresponding address to the access under processing is stored in the advance issuance address memory section 119 is checked by the address comparison section 116. If the address is stored in the advance issuance address memory section 119, the process proceeds to Step 302 and, if not, Step 307 and Step 309 are performed in parallel. In Step 307, it is confirmed that a timing signal from the advance issuance timing generation section 123 reaches. When the confirmation is completed, the process proceeds to Step 308. In Step 308, the address is stored in the advance issuance address memory section 119 and the process proceeds to Step 303.

In Step 309, the buffer reservation management section 128 reserves a buffer of which information is updated in the conversion table buffer 129 and the process proceeds to Step 310. In Step 310, an access for updating the conversion table buffer 129 is generated by the buffer update control section 117, an update access is issued in the access issuance control section 118 and the process proceeds to Step 311. In Step 311, according to information read from the address conversion table 130, one of buffers in the conversion table buffer 129 which is specified by the buffer reservation management section 128 is updated. The updated information is used in Step 304.

Finally, in Step 312, an access is eventually issued to the shared resource 108.

As has been described, according to this embodiment, address conversion of FIG. 2 can be realized. With the access issuance control section 118 provided in a previous stage of the arbitration section 106, it can be prevented that an access from one master waiting for update of the conversion table buffer 129 affects on accesses of other masters. Moreover, with the address conversion section 125 provided in a subsequent stage of the arbitration section 106, according to a timing signal of the advance issuance timing generation section 123, the access issuance control section 118 issues an access without waiting for the completion of update of the conversion table buffer 129, whereby a time for waiting for update of the conversion table buffer 129 can be covered up to a certain extent and a latency needed for an access can be reduced. At this time, it is possible to prevent issuing the update access of the conversion table buffer 129 to a subsequent access which requires the same address conversion information before the completion of update of the conversion table buffer 129.

Furthermore, a time required for re-reading data which has been once read to the conversion table buffer 129 can be cut by the address comparison section 116. The access separation section 121 is effective when accesses from masters include an access of which address conversion is not desired, when one master which needs address conversion and another master which does not need address conversion are merged by a bus and then connected to the shared resource management section 103, and the like.

Furthermore, even when a plurality of masters share the conversion table buffer 129, it is possible to prevent, by the buffer reservation management section 128, information which is to be used by an access from one master from being deleted by an update access from another master.

In this embodiment, the above-described functions are all mounted in the shared resource management section 103, but some of the functions can be mounted in a master. However, as described in this embodiment, with all the functions mounted together in the shared resource management section 103, signal exchange between blocks can be prevented from taking place in many different locations throughout in the semiconductor integrated circuit 100, whereby the functions can be mounted in a simpler manner. Moreover, each function is not limited to the above-described configuration, i.e., each function does not necessarily have to be mounted in the bus I/F section 104, the resource control section 107 or the like.

The shared resource 108 may be mounted in the semiconductor integrated circuit 100.

In FIG. 1, two masters are illustrated, but the number of masters is arbitrary. The number of the shared resources is also arbitrary.

In the above description, the pre-arbitration address management section 115 in the bus I/F section 104 has been explained. When the pre-arbitration address management section 115 is mounted in the other bus I/F section 105, the pre-arbitration address management section 115 can be mounted in the same manner. Moreover, whether or not a pre-arbitration address management section is provided for each master can be arbitrarily determined.

The conversion table buffer 129 may be shared between the masters 101 and 102 or may be individually provided for each of the masters 101 and 102.

In FIG. 1, the shared resource 108 is a memory device and the address conversion table 130 is stored in the shared resource 108, but the address conversion table 130 can be stored in an arbitrary memory device. For example, if the address conversion table 130 is stored in some other memory device than the shared resource 108, in order to update the conversion table buffer 129, control for setting another access path is needed. Accordingly, the data separation section 126 is not needed in the resource control section 107 and the command separation section 122 and the command aggregation section 124 only perform separation and aggregation of buffer update accesses.

Whether or not the access separation section 121 is mounted can be arbitrarily determined according to the characteristics of the master 101.

Whether or not the access queue 120 is mounted and how many stages are provided in a queue can be arbitrarily determined. The access queue 120 may be mounted in a previous stage of the access separation section 121 and a similar queue can be mounted for a non-address conversion target access. If the access queue 120 is mounted in a subsequent stage of the access separation section 121, it is effective that the access separation section 121 is so configured to include a mechanism for performing control so that a non-address conversion target access does not precede an address conversion target access.

Whether the address comparison section 116 is mounted can be arbitrarily determined. If the address comparison section 116 is not mounted, it is judged that there is not necessary information in the conversion table buffer 129 at all the time, so the conversion table buffer 129 is updated each time an access is made. Thus, a time for access is increased and the performance of the entire circuit is influenced. However, a configuration without the address comparison section 116 is effective in terms of reduction in area if reduction in the performance is not a problem. The address comparison section 116 can be so configured to perform comparison between addresses for a plurality of access request commands stored in the access queue 120 to update the conversion table buffer 129 before an actual access is made. Thus, a waiting time for update of the conversion table buffer 129 can be covered up, resulting in improved performance. In this case, if update accesses of the conversion table buffer 129 confirmed at the same time correspond to continuous addresses in the address conversion table 130 or the like, it is effective to aggregate update commands as a command and issue the aggregated command.

Whether or not the advance issuance address memory section 119 is mounted can be arbitrarily determined. Assume that the advance issuance address memory section 119 is not mounted. If an access is issued without waiting for the completion of update of the conversion table buffer 129, a subsequent access might request update of the same address again, thus resulting in reduction in performance of the entire circuit. However, if the performance is within an allowable range, a configuration without the advance issuance address memory section 119 achieves effect of reducing the area. Also, the function of the advance issuance address memory section 119 and the function of the buffer reservation management section 128 can be merged. For example, when the conversion table buffer 129 is updated, the function of the advance issuance address memory section 119 can be substituted by updating, ahead of writing of conversion output addresses, only conversion input addresses of the conversion table buffer 129 with new information and reserving use of updated information and also confirming the conversion table buffer 129 and a reservation management counter.

Whether or not the advance issuance timing generation section 123 is mounted can be arbitrarily determined. A location in which the advance issuance timing generation section 123 is mounted is also arbitrary. If the advance issuance timing generation section 123 is not mounted, the completion of update of the conversion table buffer 129 is waited for at all the time in the access issuance control section 118, but a circuit area can be reduced by an area corresponding to the advance issuance timing generation section 123.

Whether or not the buffer reservation management section 128 is mounted can be arbitrarily determined. For example, if the conversion table buffer 129 is not shared by masters, depending on conditions such as intervals of access issuance from masters and the like, necessary information is not updated before the information is used. Moreover, to determine a buffer that is to be updated next in the buffer reservation management section 128, an arbitrary method such as general LRU (Least Recently Used) algorithm and the like can be used. If the buffer reservation management section 128 does not exist, a buffer to be updated may be determined when information is written in the conversion table buffer 129.

In FIG. 1, the function of waiting for the completion of update of the conversion table buffer 129 is not mounted in the address conversion section 125. However, the completion of update of the conversion table buffer 129 can be confirmed each time for safety purpose.

It is not necessary to store all addresses in the first address space in the advance issuance address memory section 119.

Only upper bits of an address corresponding to a conversion input address stored in the conversion table buffer 129 may be stored.

In the data separation section 126, information is obtained from the command aggregation section 124 for separation of data. However, the function of separating data from the shared resource 108 to the bus I/F sections 104 and 105 can be also used.

The method for generating an address to the address conversion table 130 and the method for generating a search key to the conversion table buffer 129, which have been illustrated in FIG. 2 are merely examples and an arbitrary method for generating such information can be used.

<<Second Embodiment>>

Figure 4:
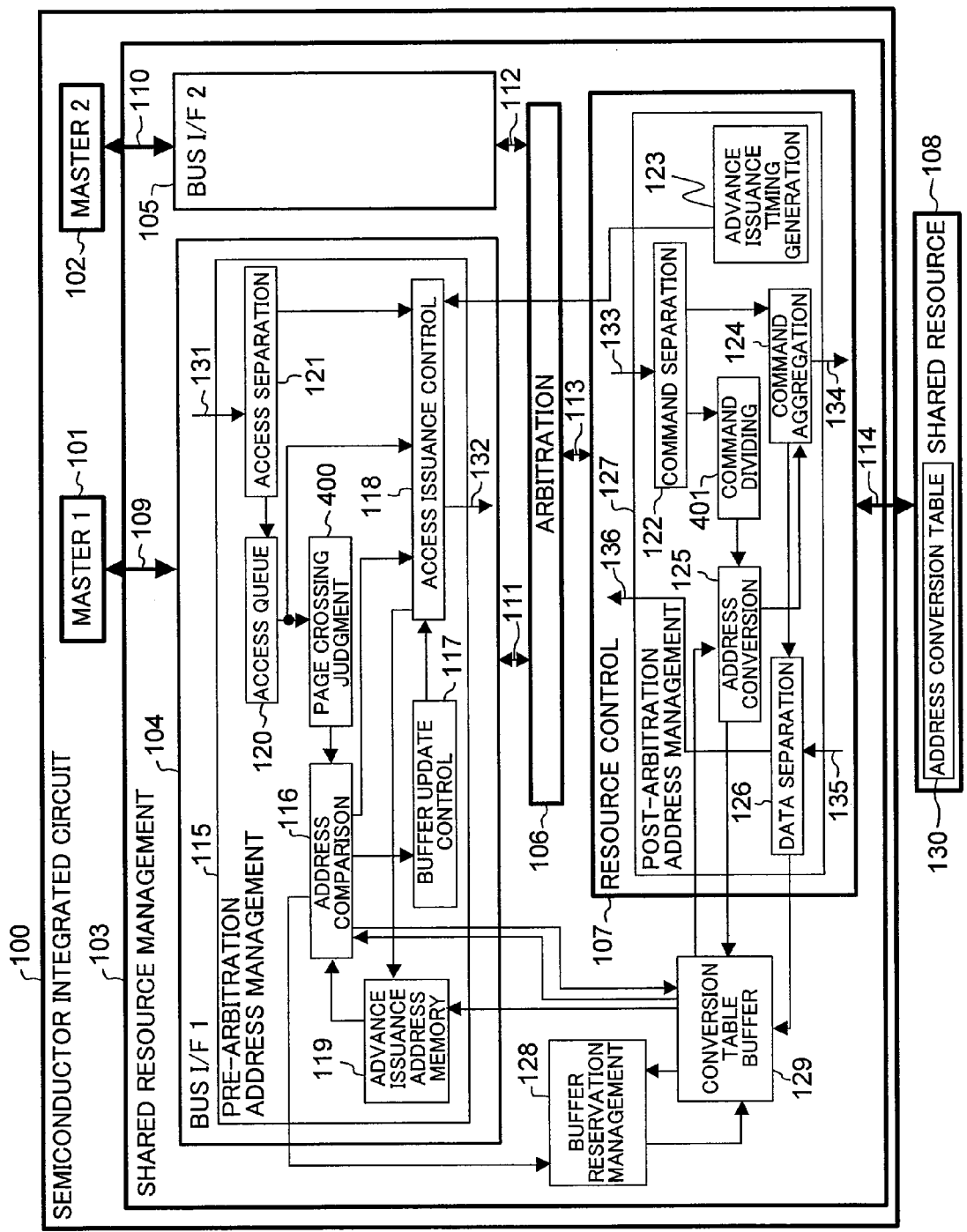
FIG. 4 is a block diagram illustrating a configuration of an electronic apparatus including a semiconductor integrated circuit which has a data processing system according to a second embodiment of the present invention.

FIG. 4 is a block diagram illustrating an electronic apparatus including a semiconductor integrated circuit which has a data processing system according to a second embodiment of the present invention. FIG. 4 illustrates a configuration obtained by adding a page crossing judgment section 400 and a command dividing section 401 to the configuration of FIG. 1.

The page crossing judgment section 400 judges that an access from the master 101 crosses a plurality of address conversion unit regions, generally called "page", when the access actually crosses pages, and notifies the address comparison section 116 of addresses to be compared. The command dividing section 401 divides address conversion target accesses, which have been separated by the command separation section 122, for each page and transfers each divided access to the address conversion section 125.

Figure 5:
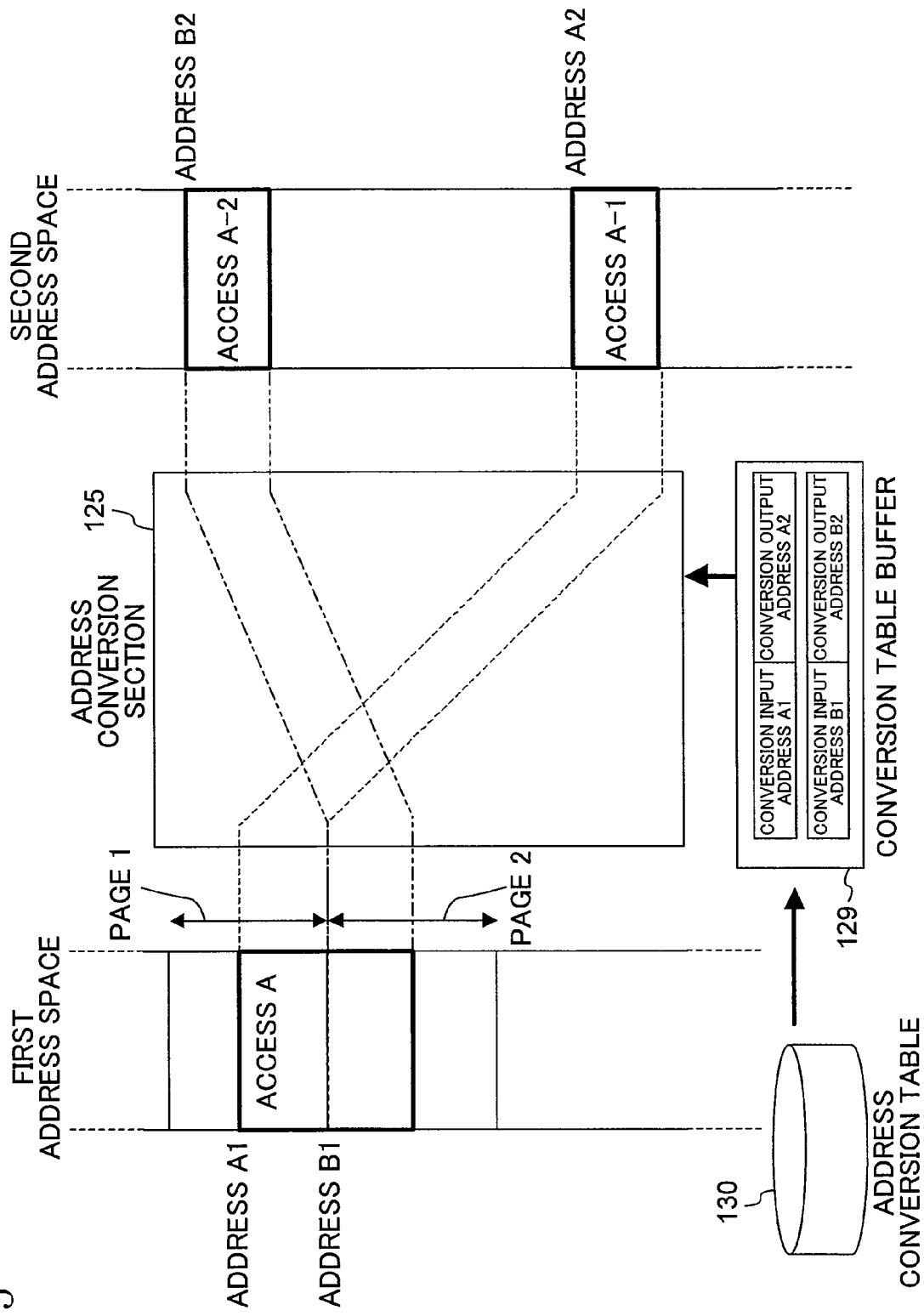
FIG. 5 is a conceptual illustration of address conversion in the configuration of FIG. 4.

FIG. 5 is a diagram illustrating an example of address conversion of an access crossing a plurality of pages. In FIG. 5, an access A in a first address space issued from the master 101 includes two regions, i.e., a region which is included in page 1 and whose start address is an address A1 and a region which is included in page 2 and whose start address is an address B1. Through access conversion, the access A is converted into two discontinuous accesses A-1 and A-2 in a second address space. When the access A is received, the page crossing judgment section 400 judges from the start address of the access A and a transfer size that the access A crosses two pages, and notifies the address comparison section 116 of the address A1 and the address B1 which are subjected to address conversion. The address comparison section 116 judges whether or not necessary information for address conversion of the address A1 and the address B1 exists in the conversion table buffer 129. If the information does not exist in the conversion table buffer 129, update of the conversion table buffer 129 is performed in the manner described in the first embodiment.

The command dividing section 401 divides the access A into an access whose start address is the address A1 and an access whose start address is the address B1 and notifies the address conversion section 125 of the divided addresses. The address conversion section 125 performs address conversion individually to each of divided commands.

When the address conversion section 125 is provided in a previous stage of the arbitration section 106, dividing of an access into accesses of a page size by the command dividing section 401 is performed before arbitration by the arbitration section 106. Accordingly, many accesses are issued to the arbitration section 106 and a waiting time for arbitration occurs many times in the arbitration section 106. This might result in reduction in the performance of the entire circuit. With the configuration of this embodiment, however, this problem can be solved.

If the region whose start address is the address A1 and the region whose start address is the address B1 in FIG. 5 are continuous and address conversion information is stored in continuous addresses in the address conversion table 130, it is possible to transfer accesses from the buffer update control section 117 as an aggregated access. The number of pages included in the access A may be any number and addresses do not necessarily have to be continuous.

In FIG. 4, the command dividing section 401 is mounted. However, depending on a specification of the shared resource 108, an access originally has to be divided into accesses of a suitable size for accessing the shared resource 108 in the resource control section 107. If a divided access fits in a page, the command dividing section 401 does not have to be additionally mounted and can be substituted by the original dividing mechanism. For example, when the shared resource 108 is a SDRAM, an access is eventually divided into accesses of a burst length for accessing the SDRAM. In such a case, if the address conversion section 125 is mounted in a subsequent stage of a dividing mechanism for dividing an access into SDRAM commands, the command dividing section 401 does not have to be provided.

<<Third Embodiment>>

Figure 6:
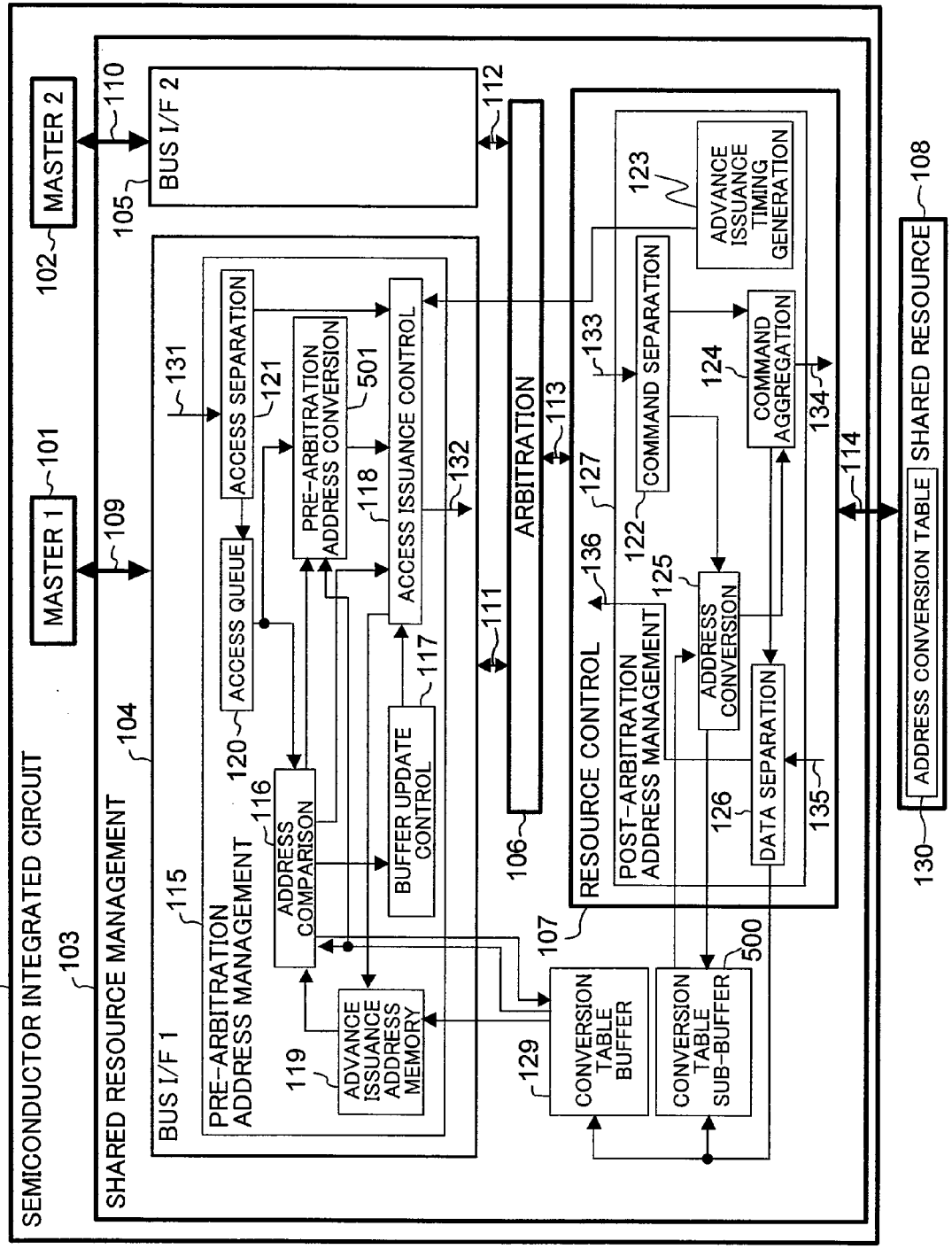
FIG. 6 is a block diagram illustrating a configuration of an electronic apparatus including a semiconductor integrated circuit which has a data processing system according to a third embodiment of the present invention.
Figure 7:
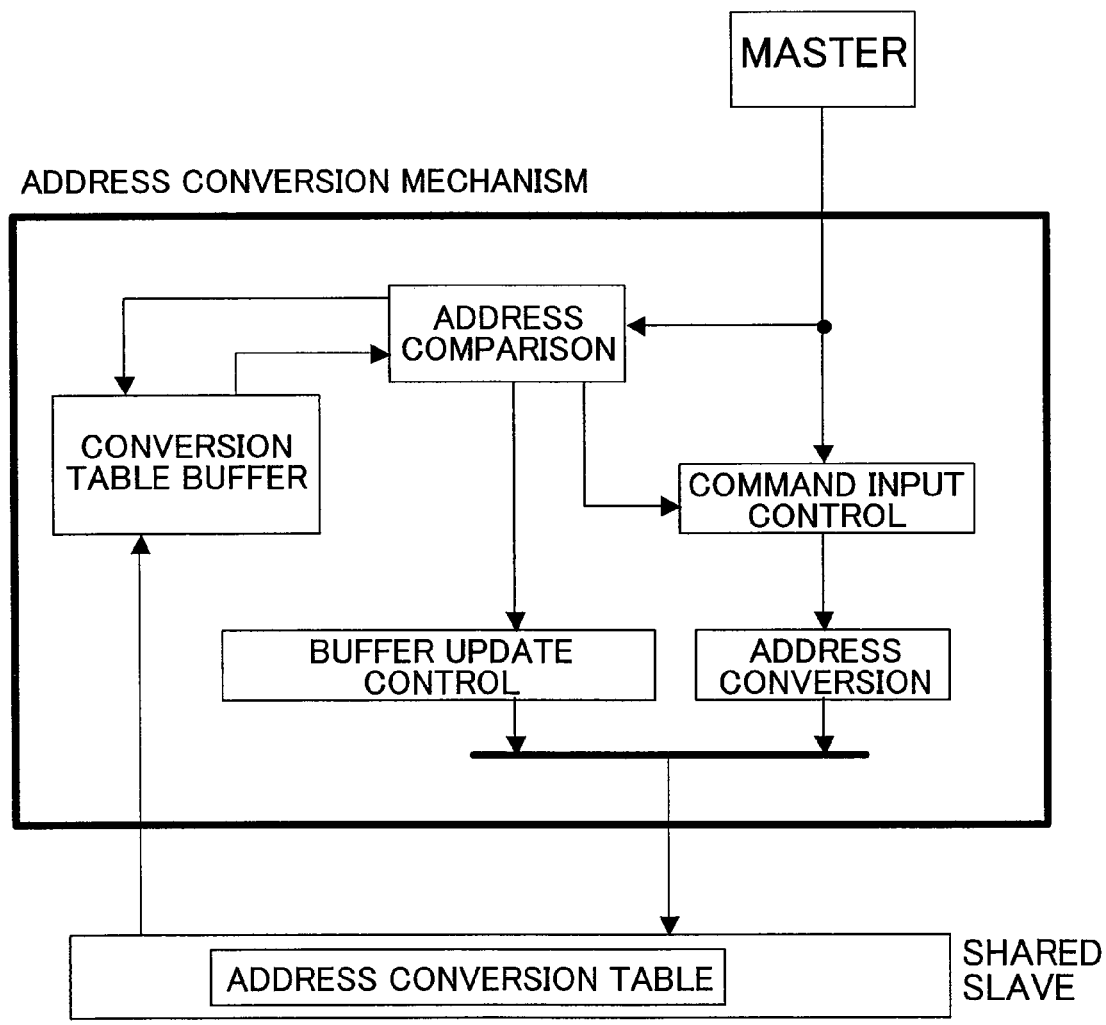
FIG. 7 is a block diagram of an exemplary known address conversion mechanism.
Figure 8A:
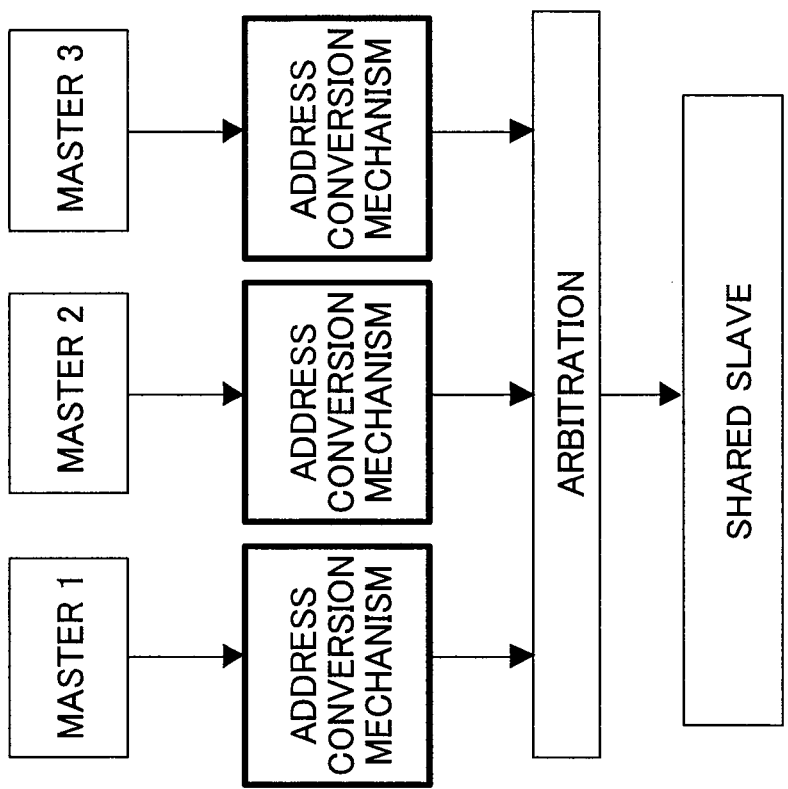
FIGS. 8A and 8B are block diagrams each illustrating an exemplary arrangement of the known address conversion mechanism.
Figure 8B:
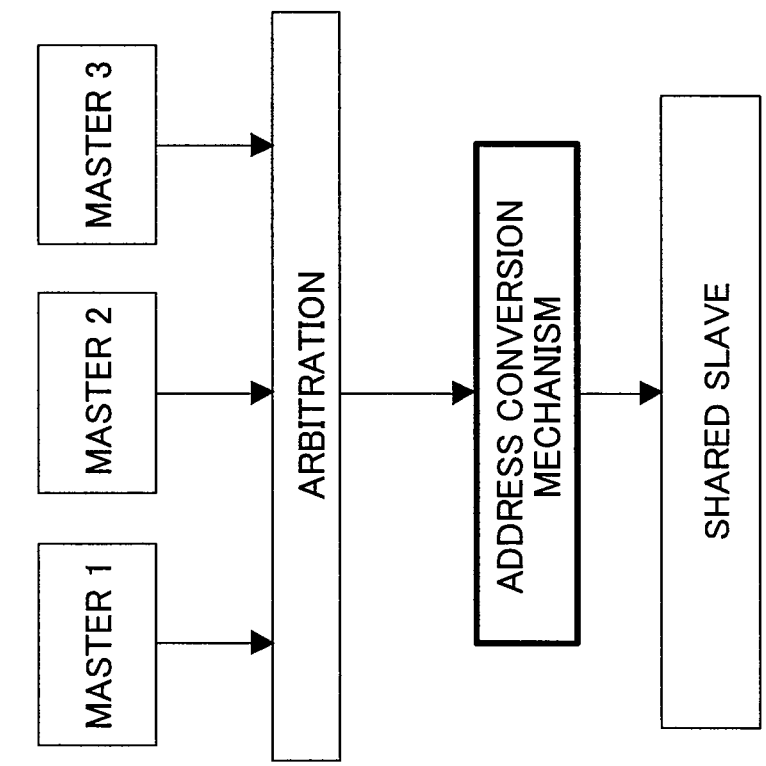

FIG. 6 is a block diagram illustrating an electronic apparatus including a semiconductor integrated circuit which has a data processing system according to a third embodiment of the present invention. FIG. 6 illustrates a configuration obtained by eliminating the buffer reservation management section 128 and adding a conversion table sub-buffer 500 and a pre-arbitration address conversion section 501 from and to the configuration of FIG. 1. Specifically, in FIG. 6, the conversion table buffer 129, which is shared by the pre-arbitration address management section 115 and the post-arbitration address management section 127 in FIG. 1, is used as an exclusive buffer of the pre-arbitration address management section 115 and another conversion table sub-buffer 500 is provided for the post-arbitration address management section 127.

When the address comparison section 116 judges that there is necessary information in the conversion table buffer 129, the pre-arbitration address conversion section 501 performs address conversion and then the access issuance control section 118 issues an access to the arbitration section 106. A function of separating an access which has been already address-converted by the pre-arbitration address conversion section 501 and immediately sending the access to the command aggregation section 124 is added to the command separation section 122.

If there is not necessary information in the conversion table buffer 129, address conversion is not performed in the pre-arbitration address conversion section 501, an access is output to the arbitration section 106 and address conversion is performed using the conversion table sub-buffer 500 in the address conversion section 125 in the post-arbitration address management section 127. Not only the conversion table buffer 129 but also the conversion table sub-buffer 500 is simultaneously updated by a buffer update access issued from the buffer update control section 117.

Due to the existence of the pre-arbitration address conversion section 501, unlike the first embodiment, a situation where, despite that the address comparison section 116 judges that there is necessary information in the conversion table buffer 129, the information is deleted before address conversion is performed in the address conversion section 125 does not arise Also, with the conversion table sub-buffer 500 individually prepared for each master, information to be used in the address conversion section 125 is not deleted by an update access from another master. Therefore, there is no need to mount the buffer reservation management section 128 of the first embodiment.

The conversion table sub-buffer 500 is provided only to temporarily store information used in the address conversion section 125 and thus can have only a small buffer amount. If address conversion in the address conversion section 125 requires many cycles, a subsequent access has to be kept in a wait state. Therefore, it is effective, in terms of achieving address conversion in the address conversion section 125 with a small cycle number even when the semiconductor integrated circuit 100 is operated at a high frequency, that the conversion table sub-buffer 500 is small.

To make masters share the conversion table sub-buffer 500, an exclusive buffer reservation management section may be provided.

As has been described, a data processing system according to the present invention is effective when address conversion is performed for an access to a shared slave in a system in which a plurality of masters share one or more slaves.

What is claimed is:

1. A data processing system in which a plurality of masters share a shared resource, the system comprising:
   an address conversion table indicating correspondence between a first address space used by the masters for accessing the shared resource and a second address space of the shared resource, the address conversion table being shared by the plurality of masters;
   a conversion table buffer for holding part of information of the address conversion table, the conversion table buffer being shared by the plurality of masters;
   a buffer update control section for referring to accesses from the masters and performing control so that the conversion table buffer is updated by a part of the information of the address conversion table which is necessary for address conversion of the accesses, each of said plurality of masters having a distinct buffer update control section corresponding thereto;
   an access issuance control section for keeping issuance of accesses to the shared resource in a waiting state according to an update state of the conversion table buffer, each of the plurality of masters having a distinct access issuance control section corresponding thereto;
   an arbitration section for arbitrating accesses to the shared resource issued from the access issuance control section;
   an address conversion section for performing, to an access selected by the arbitration section, address conversion from the first address space to the second address space using information of the conversion table buffer, the address conversion section being shared by the plurality of masters, and
   a buffer reservation management section for reserving, before an access is issued from the access issuance control section, necessary information for address conversion in the conversion table buffer to suppress update of the necessary information with another information in the address conversion table until the address conversion is completed in the address conversion section.

2. The data processing system of claim 1, further comprising an advance issuance timing generation section for notifying the access issuance control section of an access issuance timing at a time when it is assured that the necessary information for address conversion is prepared in the conversion table buffer before the access from the master reaches the address conversion section,
   wherein the access issuance control section issues an access to the arbitration section without waiting for necessary information for address conversion of an access from the masters to be prepared in the conversion table buffer, based on the access issuance timing from the advance issuance timing generation section.

3. The data processing system of claim 2, wherein the advance issuance timing generation section issues the access issuance timing after a lapse of a certain time from a time when an instruction to update the conversion table buffer is generated from the buffer update control section.

4. The data processing system of claim 2, wherein the advance issuance timing generation section issues the access issuance timing at a time when, after an instruction to update the conversion table buffer from the buffer update control section is generated, a certain number of commands are arbitrated by the arbitration section.

5. The data processing system of claim 2, wherein the advance issuance timing generation section observes a buffer update access during an access from the buffer update control section to the address conversion table and issues the access issuance timing at a time when the buffer update access is observed.

6. The data processing system of claim 2, further comprising:
an advance issuance address memory section for storing an address indicated by the access issued to the arbitration section without waiting for the necessary information for address conversion of the access from the masters to be prepared in the conversion table buffer; and
an address comparison section for judging whether or not the address indicated by the access from the masters is held by the conversion table buffer or the advance issue address memory section and instructing, only when the address is not held, to update the conversion table buffer.

7. The data processing system of claim 6, wherein, if an address stored in the advance issuance address memory section is stored in the conversion table buffer, the advance issuance address memory section releases storage of the address in the advance issuance address memory section.

8. The data processing system of claim 1, wherein the buffer reservation management section manages reservation for each information in the conversion table buffer using a counter.

9. The data processing system of claim 1, wherein the buffer reservation management section manages reservation of information in the conversion table buffer using a queue.

10. The data processing system of claim 1, further comprising:
a command dividing section for dividing, after arbitration by the arbitration section and before the address conversion, an access into accesses of an address conversion unit or a smaller size; and
a page crossing judgment section for notifying the buffer update control section of respective leading addresses of the all accesses of the address conversion unit which the access from the masters cross.

11. The data processing system of claim 10, wherein the buffer update control section has a function of aggregating a plurality of accesses issued for updating information in the conversion table buffer as a single access.

12. The data processing system of claim 10, wherein the shared resource is a DRAM and uses, as the command dividing section, a dividing mechanism for dividing an access into DRAM access commands.

13. The data processing system of claim 1, wherein the shared resource is a memory device and the address conversion table is held on the memory device, and the data processing system further comprises: a data separation section for separating data for the conversion table buffer from output data from the memory device; and
a command separation section for separating accesses from the masters from accesses for updating the address conversion table.

14. The data processing system of claim 1, further comprising an access separation section for separating, of accesses from the masters, accesses which needs address conversion from accesses which do not need address conversion.

15. The data processing system of claim 14, wherein the access separation section separates accesses according to identification number, given simultaneously with each access by the masters, for notifying whether or not address conversion is needed.

16. The data processing system of claim 14, wherein the access separation section separates accesses according to accessing of the masters to a predetermined address region.

17. An electronic apparatus comprising:
a memory device; and
a semiconductor integrated circuit,
wherein the semiconductor integrated circuit includes the data processing system of claim 1 which has the memory device serving as the shared source.

18. An electronic apparatus comprising:
an access function for accessing to a memory device on network; and
a semiconductor integrated circuit,
wherein the semiconductor integrated circuit includes the data processing system of claim 1 which has the memory device on the network serving as the shared resource.

19. A data processing system in which a plurality of masters share a shared resource, the system comprising:
an address conversion table indicating correspondence between a first address space used by the masters for accessing the shared resource and a second address space of the shared resource, the address conversion table being shared by the plurality of masters;
a conversion table buffer for holding part of information of the address conversion table, the conversion table buffer being shared by the plurality of masters;
a buffer update control section for referring to accesses from the masters and performing control so that the conversion table buffer is updated by a part of the information of the address conversion table which is necessary for address conversion of the accesses, each of said plurality of masters having a distinct buffer update control section corresponding thereto;
an access issuance control section for keeping issuance of accesses to the shared resource in a waiting state according to an update state of the conversion table buffer, each of the plurality of masters having a distinct access issuance control section corresponding thereto;
an arbitration section for arbitrating accesses to the shared resource issued from the access issuance control section;
an address conversion section for performing, to an access selected by the arbitration section, address conversion from the first address space to the second address space using information of the conversion table buffer, the address conversion section being shared by the plurality of masters;
an address comparison section for judging whether or not necessary information for the address conversion is held in the conversion table buffer;
a conversion table sub-buffer for holding part of information of the address conversion table; and a pre-arbitration address conversion section for performing, if update of the conversion table buffer for an access from the masters is not needed, address conversion according to information of the conversion table sub-buffer before the access is arbitrated by the arbitration section.

20. The data processing system of claim 19, further comprising an access queue for holding one or more accesses from the masters,
wherein the address comparison section judges whether or not necessary information for address conversion of the one or more accesses in the access queue is held in the conversion table buffer and instructs the buffer update control section to update, at a time, information which is not held.

21. A method for performing address conversion in a system for performing arbitration of accesses from a plurality of masters to a shared resource, the method comprising:
a step of reading, to conversion table buffer, part of information of an address conversion table indicating correspondence between a first address space which an access from the masters indicates and a second address space for accessing the shared resource;
a step of making issuance of access from the masters to the arbitration be in a wait state according to an update state of the conversion table buffer;
a step of performing, to an access arbitrated by the arbitration, address conversion from the first address space to the second address space using the conversion table buffer, and
a step of reserving, before an access is issued, necessary information for address conversion in the conversion table buffer to suppress update of the necessary information with another information in the address conversion table until the address conversion is completed,
wherein each of said plurality of masters has a distinct buffer update control section corresponding thereto; and said address conversion is performed by an address conversion section which is shared by the plurality of masters.

* * * * *